United States Patent
Meanor et al.

(10) Patent No.: US 7,068,267 B2
(45) Date of Patent: Jun. 27, 2006

(54) COMPUTER-IMPLEMENTED SYSTEM AND METHOD FOR HANDLING LINKED DATA VIEWS

(75) Inventors: Phillip C. Meanor, Cary, NC (US);
Simon Laws Smith, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 288 days.

(21) Appl. No.: 10/413,448

(22) Filed: Apr. 14, 2003

(65) Prior Publication Data

US 2004/0201588 A1   Oct. 14, 2004

(51) Int. Cl.
*G06T 15/00* (2006.01)

(52) U.S. Cl. .................. 345/418; 345/440; 707/102; 715/764

(58) Field of Classification Search ............ 345/418, 345/419, 440, 622; 707/102; 715/764; 717/105
See application file for complete search history.

(56) References Cited

U.S. PATENT DOCUMENTS

| | | | |
|---|---|---|---|
| 5,528,735 A | 6/1996 | Strasnick et al. | 345/427 |
| 6,222,557 B1 | 4/2001 | Pulley, IV et al. | 345/622 |
| 6,259,451 B1 * | 7/2001 | Tesler | 345/419 |
| 6,301,579 B1 * | 10/2001 | Becker | 707/102 |
| 6,400,366 B1 | 6/2002 | Davies et al. | 345/440 |
| 6,480,194 B1 | 11/2002 | Sang'udi et al. | 345/440 |
| 6,529,216 B1 * | 3/2003 | Moore et al. | 715/764 |
| 6,775,819 B1 * | 8/2004 | Hardikar et al. | 717/105 |
| 6,842,176 B1 * | 1/2005 | Sang'udi et al. | 345/440 |

* cited by examiner

*Primary Examiner*—Phu K. Nguyen
(74) *Attorney, Agent, or Firm*—Jones Day

(57) ABSTRACT

A computer-implemented system and method for use in a data visualization system having a data model. The data model contains data observations. A first view and a second view are used to display at least a portion of the data observations contained in the data model. Conditional data that is associated with the second view specifies how the second view's display is modified based upon a selection of a data observation within the first view.

61 Claims, 13 Drawing Sheets

| Selection Mode, View Type | Mask Parameter | CmpValue Parameter |
|---|---|---|
| Global | 0x80000000 | 0x80000000 |
| Local, Selector | Selector's Mask | Selector's Mask |
| Local, Observer (Union) | All Selection Masks | 1 |
| Local, Observer (Intersection) | All Selection Masks | All Selection Masks |

FIG. 10

COMPUTER-IMPLEMENTED SYSTEM AND METHOD FOR HANDLING LINKED DATA VIEWS

TECHNICAL FIELD

The present invention relates generally to computer-implemented information display and more particularly to handling linked data views.

BACKGROUND

Within the field of data visualization is the area of dynamically-linked graphs or views. Under the linked-view architecture, views (graphs, tables, etc.) share a common data model and each view contains a depiction of the data observations in the data model. Each data observation has data values and properties associated with it. Whenever a change to a data value or property occurs, the data model notifies all views that a change has taken place. The view then updates its display.

One data observation property common to most data model implementations is the observation selection property. This property is usually designed to hold a Boolean value that indicates whether the observation has been selected in one (or more) of the views associated with the data model.

Under the linked-view paradigm, the purpose of observation selection is to visually focus attention on specific data points across multiple views simultaneously. Selected observations are typically differentiated from unselected observations in a view using highlighting, color, or size. Selecting an observation in one view results in that observation being displayed as selected in all the data model views. Such a technique has been termed the global selection approach.

FIGS. 1 and 2 illustrate the traditional global observation selection approach. The plots (30, 32, 34) in these figures are generated from a data set containing information and statistics about former professional baseball players. Each figure contains three plots: a histogram 30 of the players salaries; a bar chart 32 showing the number of players in the data set by their fielding position; and a scatter plot 34 of the number of At Bats versus the number of RBIs for each player.

Because the displays (30, 32, 34) employ the traditional global observation selection approach, selections made in one plot are automatically visualized in all plots. The visualization is achieved by the data model notifying the views of selection property changes. After the views retrieve the selection property changes from the data model, the views update their displays.

For example, in FIG. 1, the salary histogram 30 was used to select observations involving players with higher salaries. The selected observations are those shown within region 40. These observations are highlighted in the bar chart 32 as shown by the patterned portions (e.g., 42) of the bars in the bar chart 32. The points appearing in the scatter plot 34 are players whose salaries correspond to the observations selected in the histogram 30.

In FIG. 2, the bars (50, 52, 54) representing the fielding positions for the outfielder positions (center field, left field, and right field) are selected. The previous selections from the salary histogram 30 have been replaced with fielding position selections in all the plots (30, 32, 34). For example, histogram 30 shows the salaries for the positions selected in bar chart 32. The display of bar chart 32 has been modified to highlight the selected positions; and plot 34 shows points related to the selected positions.

The usefulness of this traditional approach diminishes as the size and dimension of data sets become larger. This is because the observation selection process is limited in its ability to reduce or focus data selections across the views sufficiently to aid the data investigation process.

SUMMARY

In accordance with the teachings provided herein, a computer-implemented system and method are used in a data visualization system which has a data model. The data model contains data observations. A first view and a second view are used to display at least a portion of the data observations contained in the data model. Conditional data that is associated with the second view specifies how the second view's display is modified based upon a selection of a data observation within the first view.

BRIEF DESCRIPTION OF THE DRAWINGS

FIG. 10 is a table illustrating an example of how views may be configured under different modes and view types;

DETAILED DESCRIPTION

Figure 1:
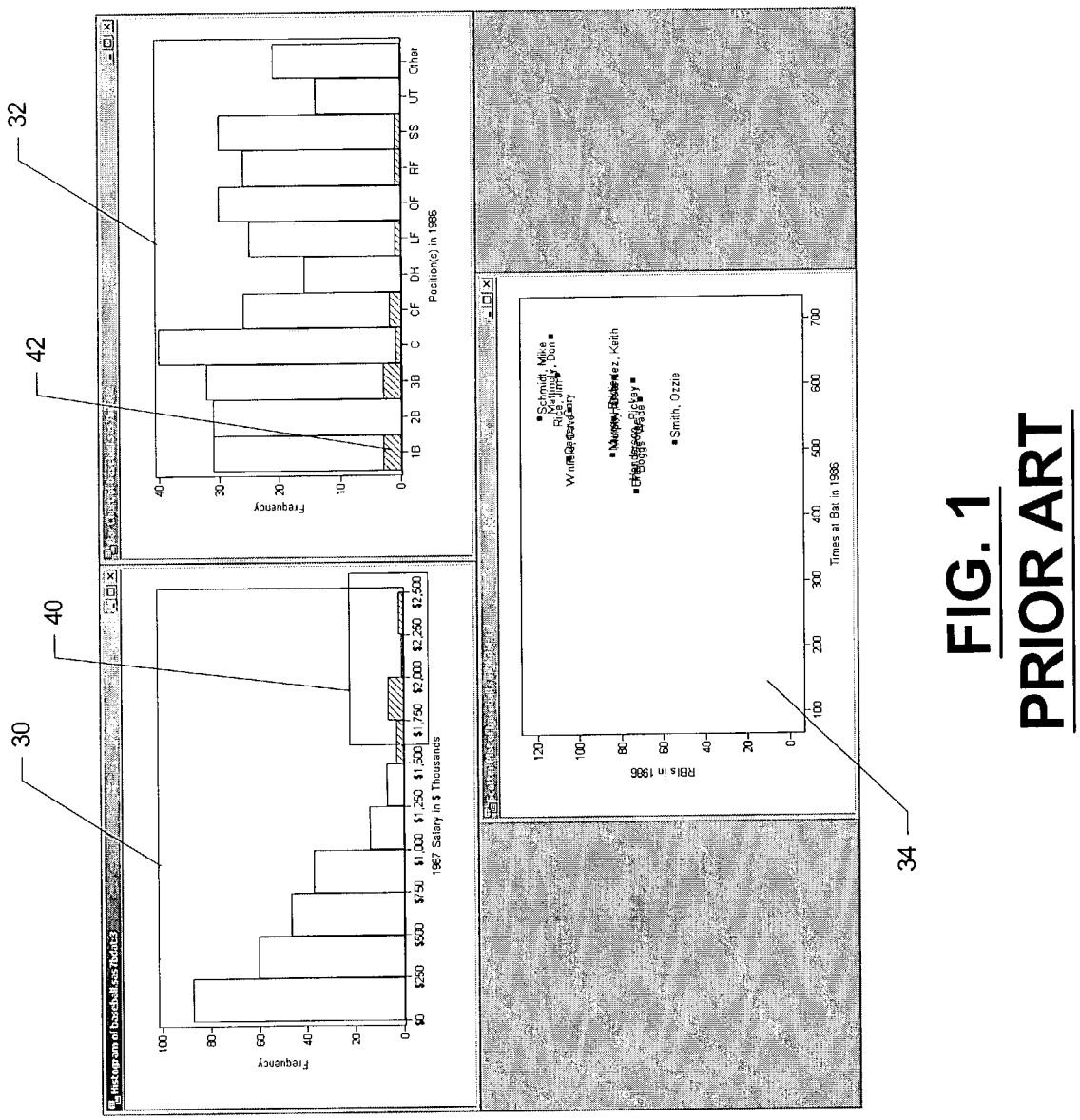
FIGS. 1 and 2 are display screen shots depicting a prior art approach to handling data displays.
Figure 2:
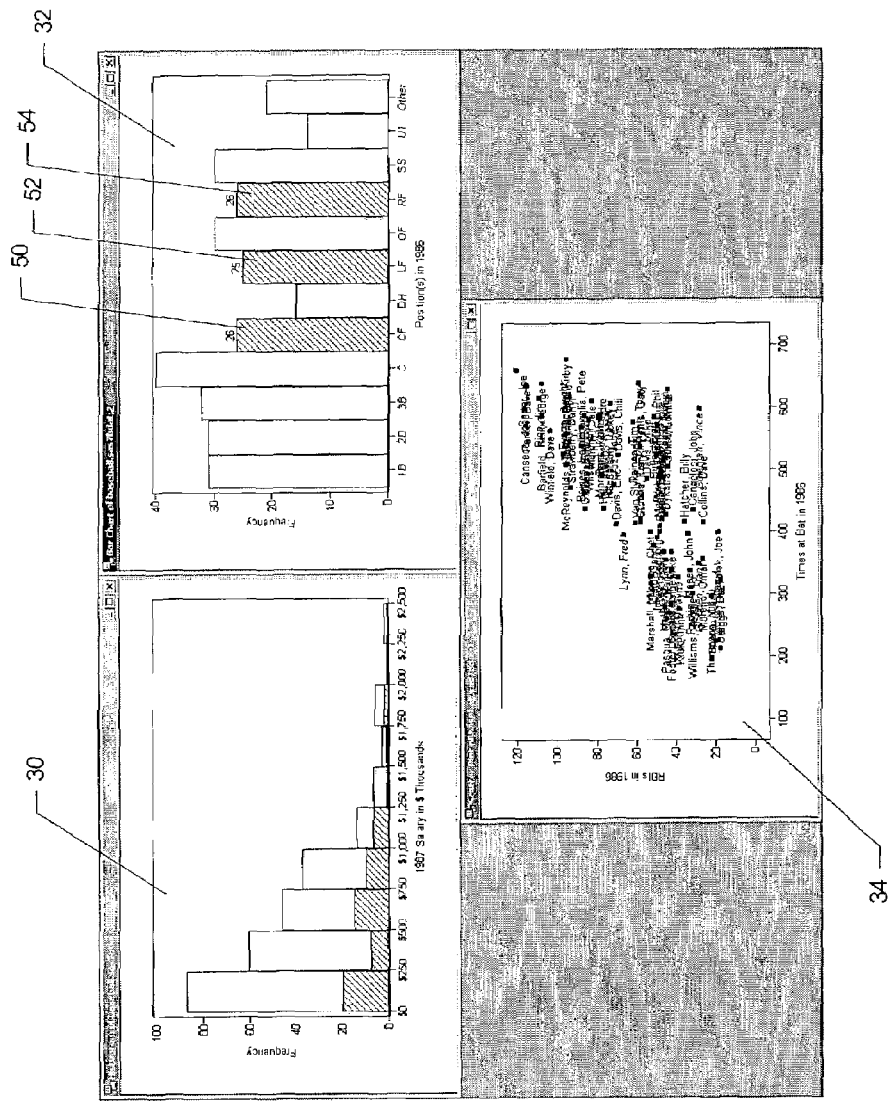
Figure 3:
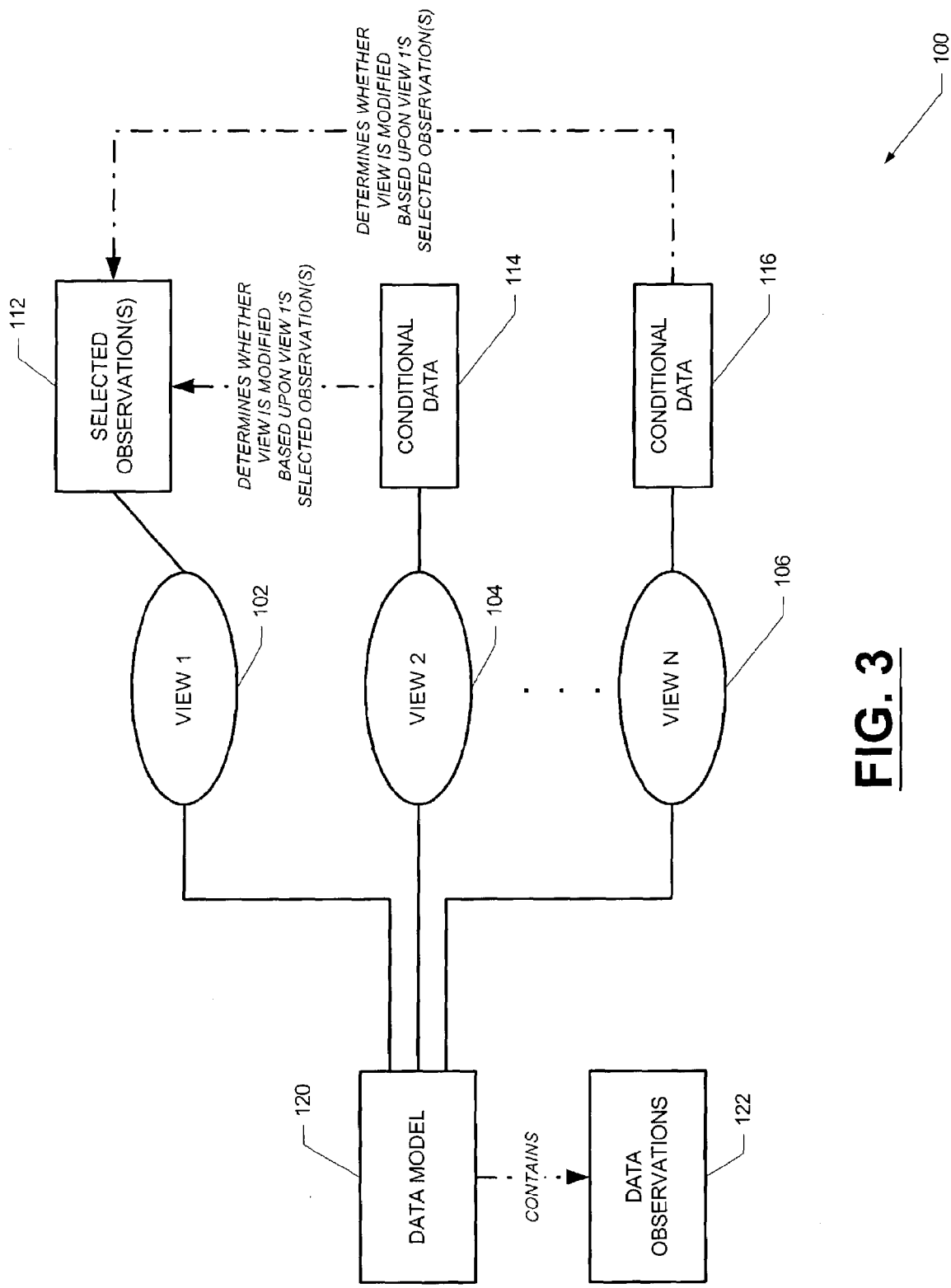
FIG. 3 is a block diagram depicting software and computer components used in a data visualization system.

FIG. 3 depicts a system 100 that configures views (102, 104, 106) to conditionally display selected data observations. In the system 100, a view has conditional data that instructs the view whether the view's display should be modified based upon selection of data in another view. For example, a user may select a data observation 112 in a first view 102. A second view 104 can decide whether to modify its display due to the selected observation 112. The second view 104 bases its decision upon its conditional data 114. The conditional data 114 provides the view 104 with flexibility and options for displaying selected observations 112 in a more focused manner.

A data model 120 contains the data observations 122 which the views (102, 104, 106) use in their displays. Because different conditional data (114, 116) may be associated with different views (104, 106), each view (104, 106) can independently decide the best way to display the data observations relative to its own view. This is referred to as local selection.

Figure 4:
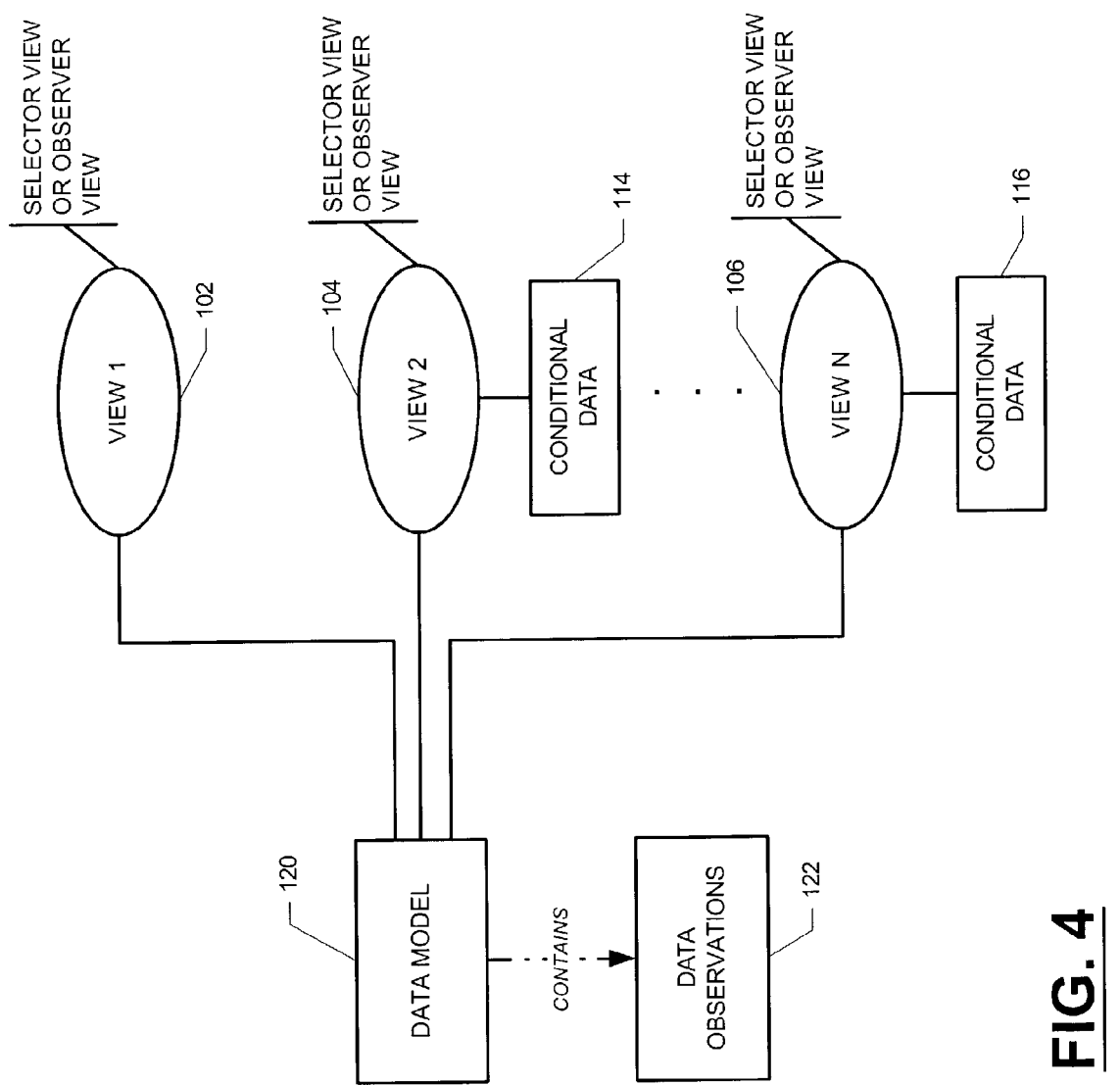
FIG. 4 is a block diagram depicting different modes in which a view may be.

With local selection, a view can be configured by the user to operate in different ways, such as operating as a selector view or as an observer view. As shown in FIG. 4, one or more views (102, 104, 106) can be configured to operate as selector views, and likewise one or more views (102, 104, 106) can be configured to operate instead as observer views. A view operating as a selector view allows the user to select observations. A selector view is assigned conditional data by the data model 120 which determines how data is to be displayed within the view. When the user selects an observation in a selector view, the observation is marked as selected in the data model 120.

Another way to configure a view is as an observer view. An observer view does not allow the user to select observations. An observer view conditionally displays selections made in selector view(s) by interpreting its conditional data. For example, an observer view may display a union or the intersection of the selections made in selector views or may apply another type of logical function, such as an exclusive OR or other bitwise comparison. A view's conditional data indicates whether the view is an observer view or a selector view. The conditional data also indicates that, if the view is an observer view, then what logical function is to be used.

Figure 5:
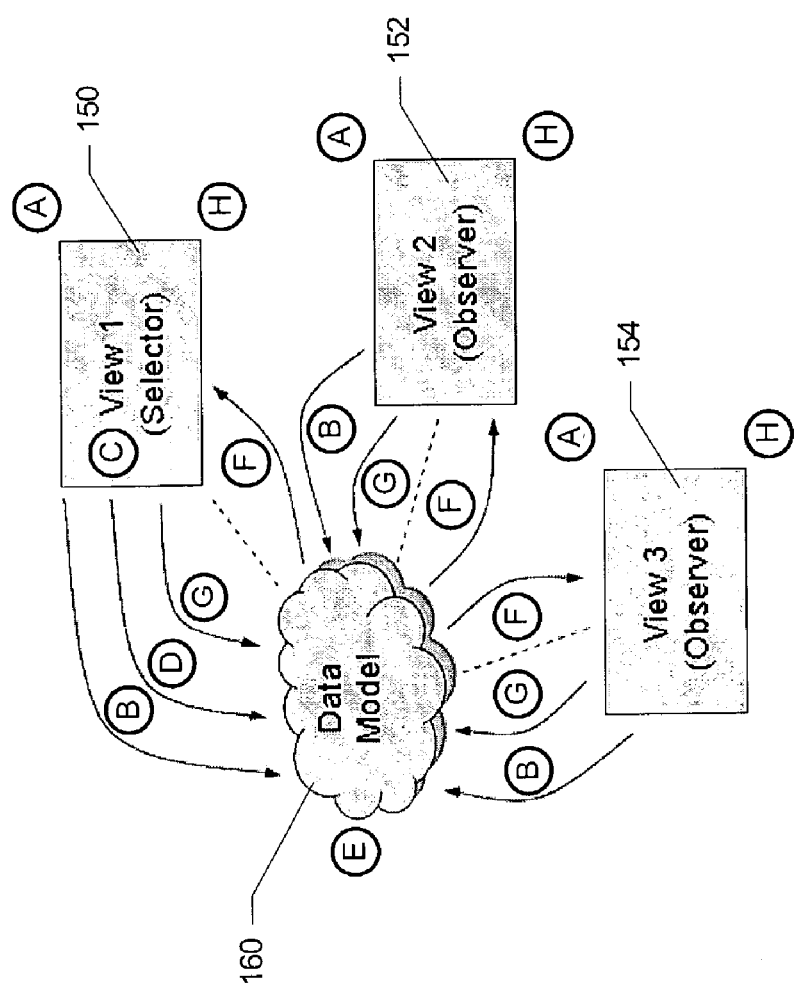
FIG. 5 is a block diagram depicting an example where one view is in a selector mode and two views are in an observer mode.

FIG. 5 shows a local selection process wherein view 150 has been configured as a selector view, and views 152 and 154 have been configured as observer views. In the step labeled A in the figure, views (150, 152, 154) are created with a link to the data model 160. In step B, views (150, 152, 154) request conditional data from the data model 160. The observer views (152, 154) request information by which they can determine what data observations have been selected in the selector view(s) (e.g., 150). In step C, the user makes observation selection(s) in selector view 150. In step D, the selector view 150 notifies the data model 160 which observations have been selected. In step E, the data model 160 updates the selector view's selection property with respect to the designated observations. In step F, the data model 160 notifies the observer views (152, 154) of selection property changes with respect to the designated observations. In step G, the observer views (152, 154) retrieve selection details from the data model 160. In step H, the observer views (152, 154) redisplay showing selected observations based on their respective conditional data.

Figure 6:
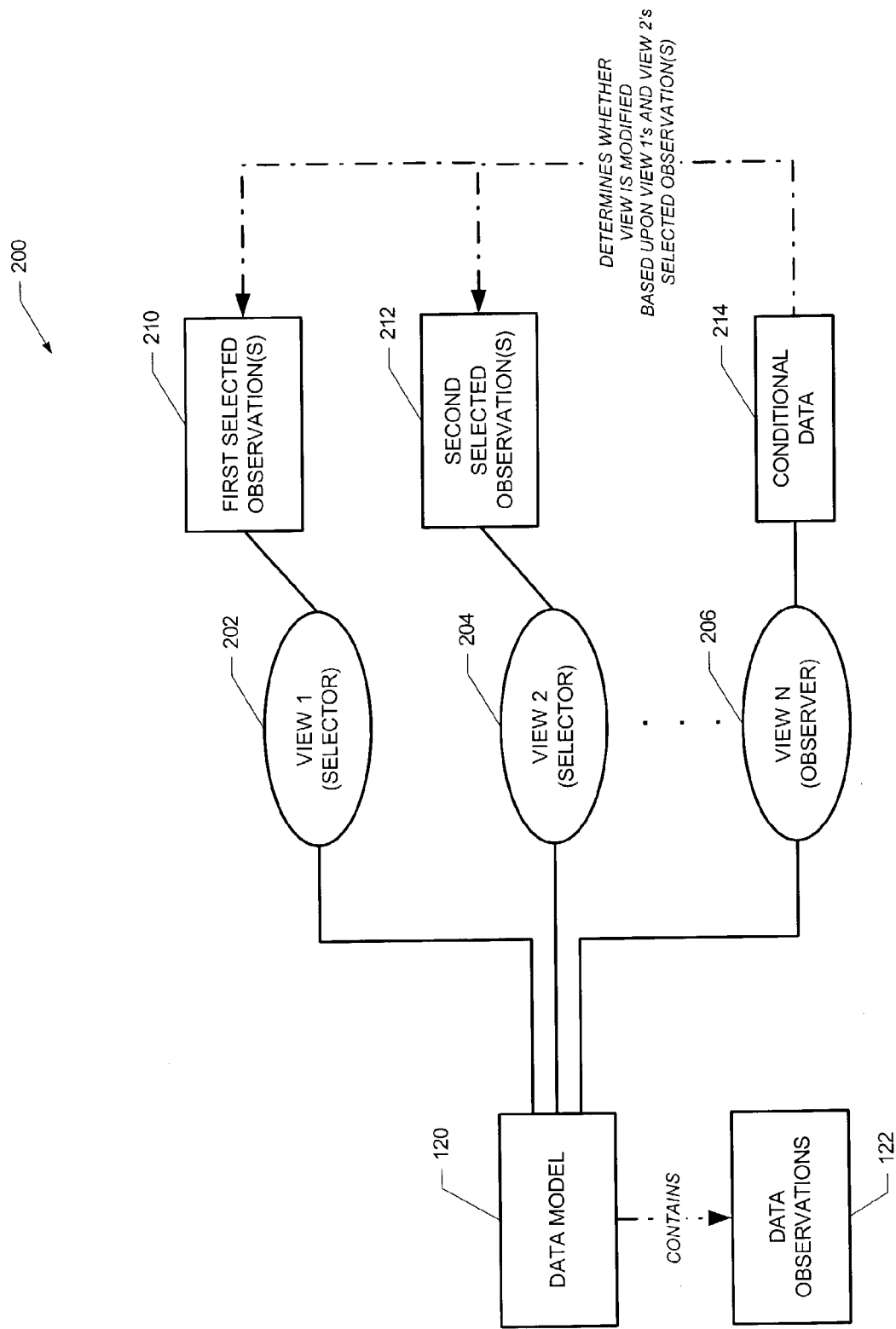
FIG. 6 is a block diagram depicting data display of a view that is dependent upon two other views.

FIG. 6 illustrates that a local selection system 200 may also include multiple selector views (202, 204). The conditional data 214 of the observer view 206 may specify that a logical function be performed upon the data (210, 212) that is selected in the two selector views (202, 204). Therefore, if there are many data dimensions, the observer view 206 can use its "internal logic" 214 to combine selections (210, 212) across many data dimensions in order to filter or focus the observation selection process. For example, the observer view 206 may display the union or the intersection of the selections (210, 212) made in selector views (204, 206). The observer view 206 may also use other logical functions in determining what to display. It should be understood that multiple observer views and multiple selector views may be handled by the system 200.

Figure 7:
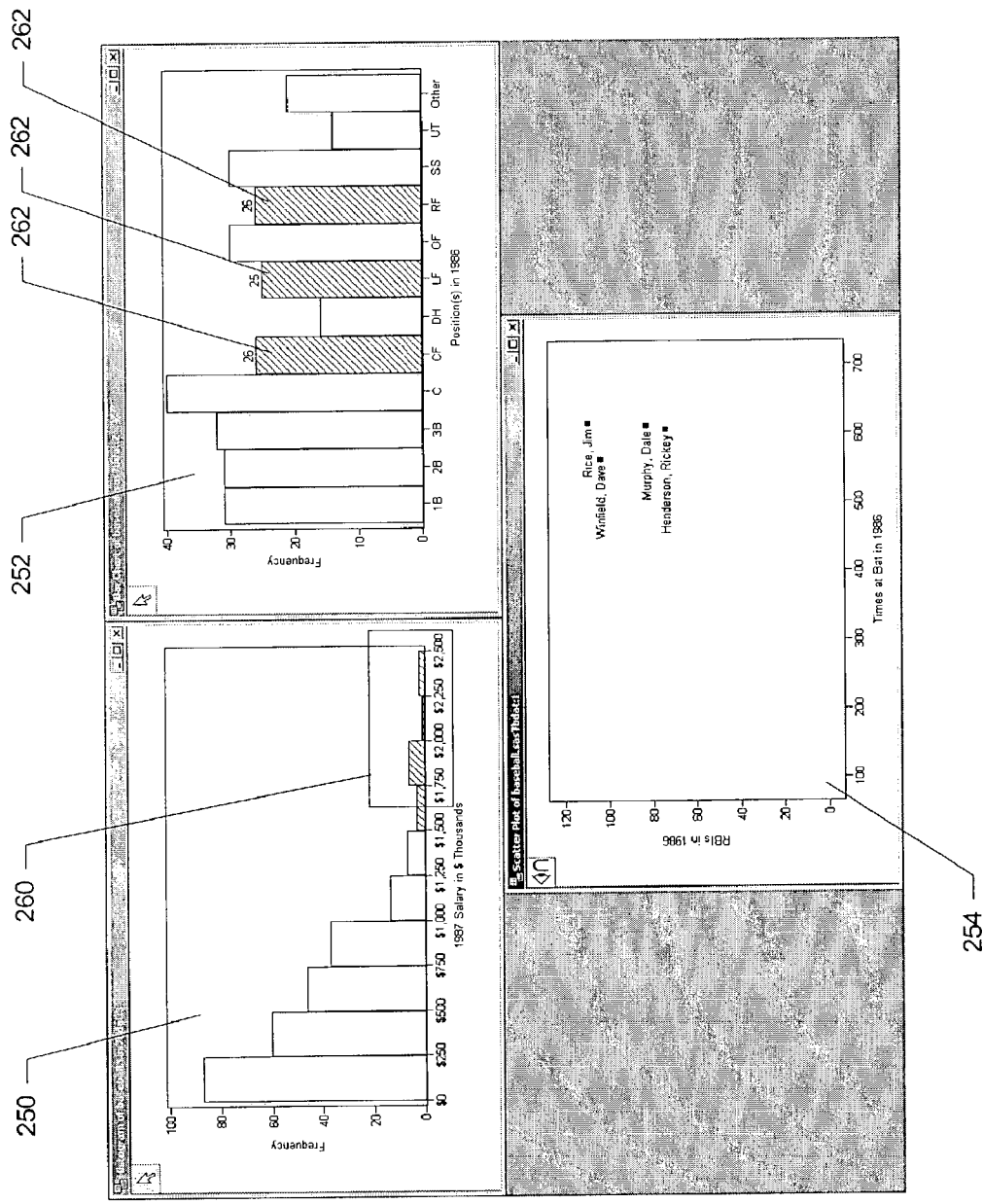
FIG. 7 is a display screen shot depicting a view that is dependent upon two other views.

FIG. 7 contains graphs (250, 252, 254) that illustrate local selection processing. The salary histogram 250 and fielding position bar chart 252 have been put into a selector mode while the scatter plot 254 is an observer view. The selector views (250, 252) in FIG. 7 allow the user to select observations (260, 262) in each of the views. When the user selects an observation in a selector view, the observation is marked as selected in the data model for that view. A selector view displays an observation as selected if the observation was selected by that view. Depending on the configuration of an observer view, the observer view may or may not display the observation (which was selected by the selector views) in the selected state.

As an illustration, the observer view 254 may display only a portion of the selected observations (260, 262), such as the intersection of observations (260, 262). Due to the intersection condition, the observer view 254 only shows players whose salaries match those selected in histogram 250 and whose position was selected in bar chart 252.

Figure 8:
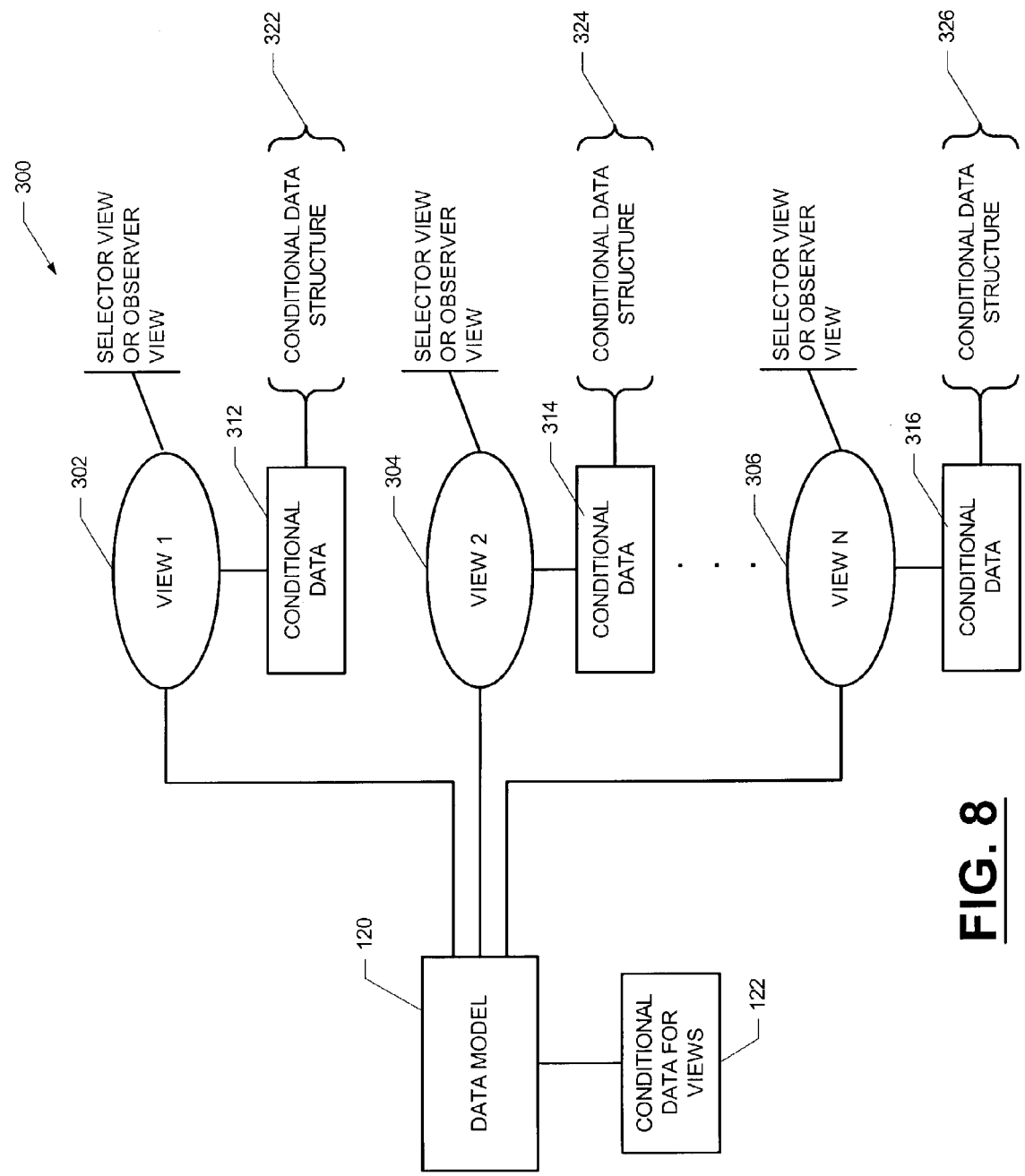
FIG. 8 is a block diagram depicting example data structures for storing conditional data.

FIG. 8 shows an example of a local selection system 300 in a linked-view, data model architecture. The views (302, 304, 306) access a data model 120 to learn their particular conditional data (312, 314, 316). In this example, conditional data (312, 314, 316) is stored in conditional data structures (322, 324, 326) which are accessed when displays are to be updated.

Figure 9:
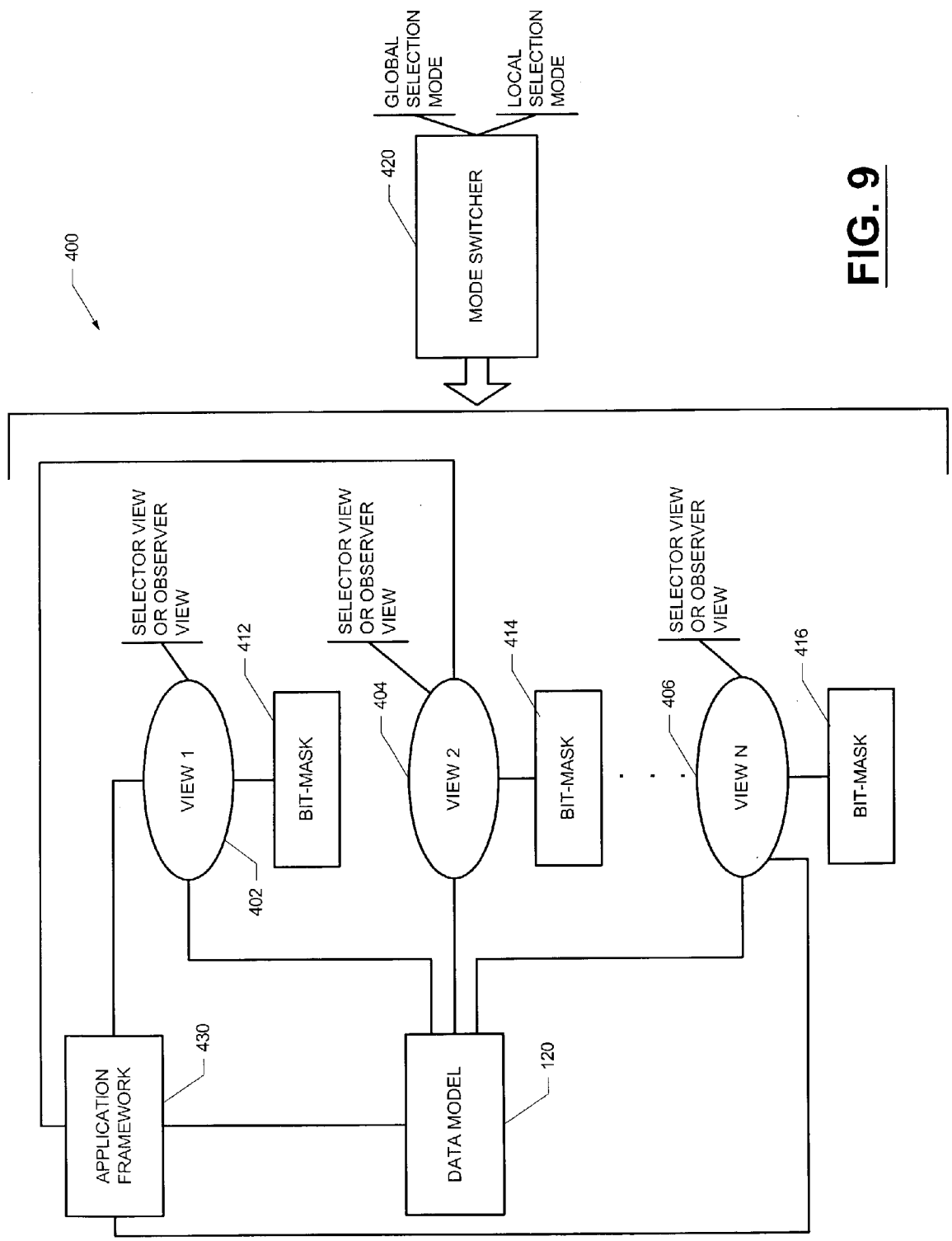
FIG. 9 is a block diagram depicting display mode switching.

As shown in FIG. 9, conditional data may be configured as bit-masks (412, 414, 416). In such a configuration, views (402, 404, 406) request bit-masks (412, 414, 416) from the data model 120. If a view is a selector view, the view requests an individual bit-mask from the data model 120 to indicate which bit in the observation selection property the view will be setting. If a view is an observer view, the view requests an all views bit-mask from the data model 120 so it will know which bits are being used in the observation selection property. For example, if a user makes observation selection(s) in a selector view, the selector view notifies the data model 120 which observations are selected along with its individual bit mask. The data model 120 updates the appropriate bit in the selection property for the designated observations. The data model 120 then notifies views (402, 404, 406) of selection property changes. The views (402, 404, 406) retrieve selection details from the data model 120. The views (402, 404, 406) redisplay showing selected observations based on their assigned bit-masks. The data model 120 is responsible for allocating and deallocating any masks used by the views (402, 404, 406) to ensure proper coordination. A view requests a selection mask from the data model and returns it to the data model when it has finished using it.

The system 400 may also support multiple modes, such as a global selection mode and a local selection mode. In global selection mode, all views (402, 404, 406) operate the same with regard to observation selection. When a user selects an observation in one view, the observation is displayed as selected in all other views. In global selection mode, the data model 120 uses the high-order bit of the 32-bit selection state property integer to store the selection state of an observation. However, it should be understood that any n-bit arrangement may be used to suit the situation at hand.

A mode switcher 420 allows a user to specify within which mode the user wishes to operate. Collaboration between the application framework 430 and the views (402, 404, 406) using the data model 120 can ensure that the views (402, 404, 406) operate in the proper modes. Examples of application frameworks include statistical analysis software packages, spreadsheet programs, or any software program that has data visualization capability. Accordingly, although the data model 120 is not involved in the observer view versus selector view issue, the data model 120 may provide the local selection framework to help effect the implementation of the observer and selector views.

In local selection mode, each view is configured as either an observer view or a selector view. Each selector view calls a data model interface method (e.g., AllocSelectionMask( )) to allocate a view-specific selection bit. The 32-bit integer that specifies a selector view's selection bit is called a selection mask. When a selector view wants to select an observation, it passes its selection mask to the data model 120 so the appropriate selection bit can be modified in that observation's selection state property integer. Depending upon the implementation, the number of selector views allowed in an application may be limited by the size of the data type holding the selection property value. For example, if the selection property is stored in a 32-bit integer, there will be a limit of 31 selector views in the application since the high order bit is used for global selection mode.

The views (402, 404, 406) attached to a common data model 120 operate in the same selection mode—either global mode or local mode. The default selection mode may be set to the global mode. When the user requests to switch from global selection mode to local selection mode, the following actions may be performed:

1. For each view attached to the common data model, the application framework calls the view's SetSelectionMode( ) method.
   When a view receives the request to enter local mode, it checks its configuration. If the view is configured as a selector per its conditional data, it calls the data model interface method AllocSelectionMask( ) to obtain a view-specific selection bit. In this situation, the data model does not fire the event EventTypeChangeSelectionMasks because the data model is still in global selection mode.
2. After each view has switched to local selection mode, the application framework calls the data model interface method SetSelectionMode(SelectionModeLocal).
   In response to this call, the data model performs the following actions:
   a) For each observation, the data model modifies the selection bits as follows:
      ObsSelectionBits &=0x7FFFFFFF;
      This statement sets to zero the high-order bit used to store selections in global selection mode.
   b) The data model fires the event EventTypeSetSelectionMode with NewValue=SelectionModeLocal.
      In response to this event, each observer view calls the data model interface method GetAllSelectionMasks( ).

When the user requests to switch from local selection mode back to global selection mode, the following actions occur:

3. The application framework calls the data model interface method SetSelectionMode(SelectionModeGlobal).
   In response to this call, the data model performs the following actions:
   a) For each observation, the data model modifies the selection bits as follows:
      if (ObsSelectionBits !=0)
         ObsSelectionBits=0x80000000;
      This statement has the effect of selecting the observation in global selection mode if any selector view had the observation selected in local selection mode.
   b) The data model frees all selection masks allocated by the AllocSelectionMask( ) method.
   c) The data model fires the event EventTypeSetSelectionMode with NewValue=SelectionModeGlobal.
      In response to this event, each view switches to global selection mode and updates its display as necessary. In this situation, the selector views do not call FreeSelectionMask( ) because the data model has already deleted all the selection masks.

When a view is initializing, it queries the data model for the current selection mode. If the data model is in global selection mode, the view's private variables relating to the selection process are set as follows:
   SelectionMask=GLOBAL_SELECTION_MASK
   SelectionCmpValue=GLOBAL_SELECTION_MASK
   AllSelectionMasks=0
If the data model is in local selection mode, the view initializes as a selector view with the following settings:
   SelectionMask=dataModel->AllocSelectionMask( )
   SelectionCmpValue=SelectionMask
When a view switches from selector to observer, it frees its selection mask by calling dataModel->FreeSelectionMask(SelectionMask) and then configures itself as follows:
   AllSelectionMasks=dataModel->GetAllSelectionMasks( )
   If the observer is in intersection mode:
   SelectionMask=AllSelectionMasks
   SelectionCmpValue=AllSelectionMasks
   If the observer is in union mode:
   SelectionMask=AllSelectionMasks
   SelectionCmpValue=1
When a view switches from observer to selector, it configures itself as follows:
   SelectionMask=dataModel->AllocSelectionMask( )
   SelectionCmpValue=SelectionMask Within the local selection system, a view uses an observation's selection property bits retrieved from the data model along with the view's private SelectionMask and SelectionCmpValue variable values to determine whether the observation should be treated as selected or not.

FIG. 10 shows how a view sets up its SelectionMask and SelectionCmpValue variables for different selection mode configurations:

A view treats an observation as selected if the following expression evaluates to true:
   ((unsigned)ObsSelectionBits & (unsigned)SelectionMask)>=(unsigned)SelectionCmpValue The bitwise 'anding' of the observation selection property bits with the view's SelectionMask variable and the subsequent comparison with the view's SelectionCmpValue variable provide a fast and efficient technique for determining an observation's selection state for the view's selection mode.

Figure 11:
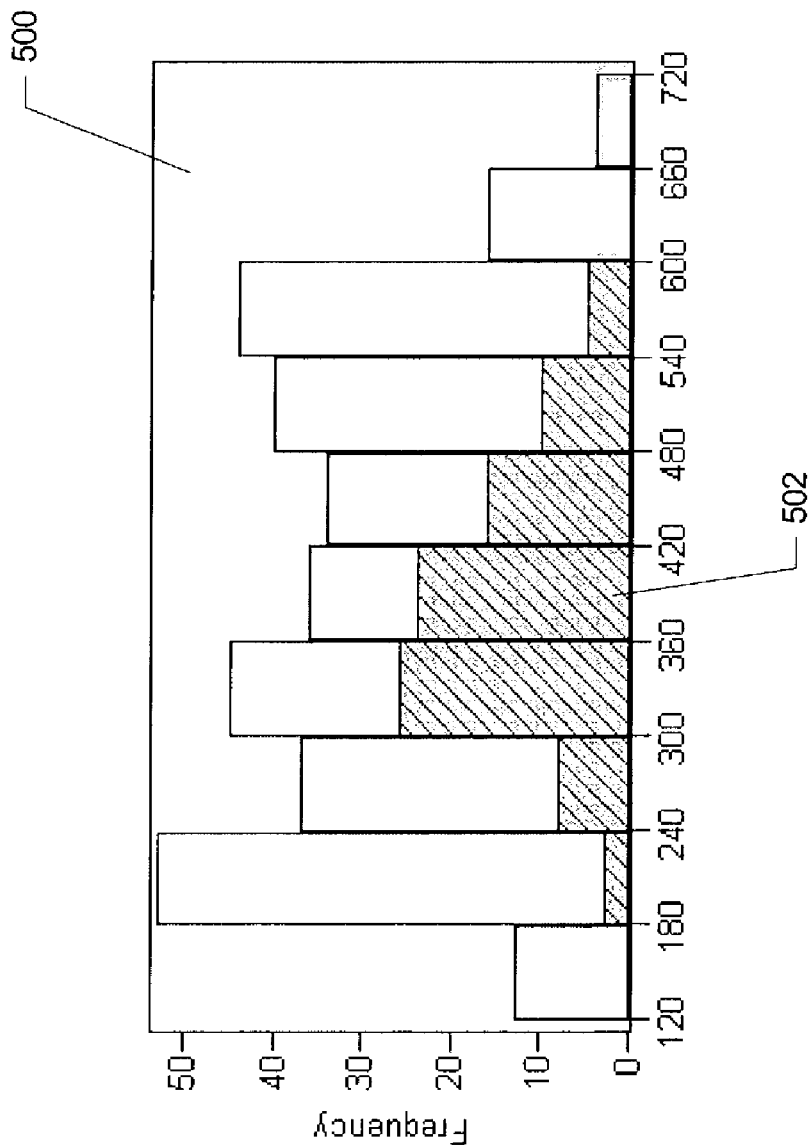
FIGS. 11 and 12 illustrate the handling of different types of views.

Proper interpretation of a data observation's selection property is important for display purposes, even if the view does not display individual observations. For instance as shown in FIG. 11, a histogram view 500 might want to highlight a subsection of an individual bar (as shown at 502) to indicate the number of observations selected in each bin. To accomplish this, it determines the number of selected observations in each bin.

Figure 12:
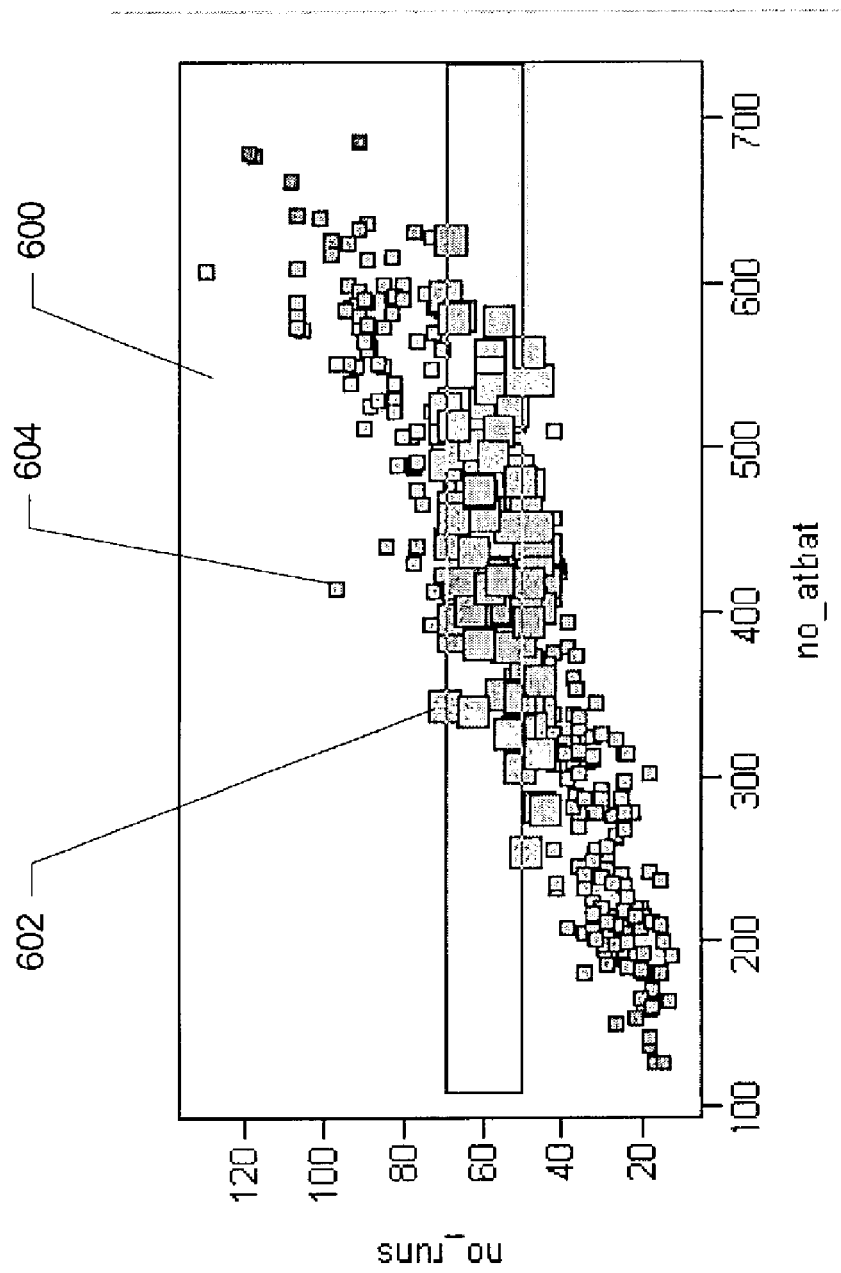

For views that display individual observations (e.g., a scatter plot), an observation's selection property might affect how an observation is displayed. As an example, the selected data observations are drawn larger (e.g., at 602) than unselected observations (e.g., 604) in the scatter plot 600 shown in FIG. 12.

It is noted that the systems described herein provide an extensible way for data views (plots, graphs, tables, etc.) to set, store, and display data observation selection properties on a local (per-view) basis while still sharing a common, linked-view data model. It should be understood that while examples have been used to disclose the invention, including the best mode, and also to enable any person skilled in the art to make and use the invention, the patentable scope of the invention is defined by the claims, and may include other examples that occur to those skilled in the art. For example, the systems disclosed herein may be used in any data visualization project, such as projects that use a linked-view data model or Model-View-Controller (MVC) architecture, or in any projects that have many views sharing the same observation selection property in a linked-view, data model software architecture.

Figure 13:
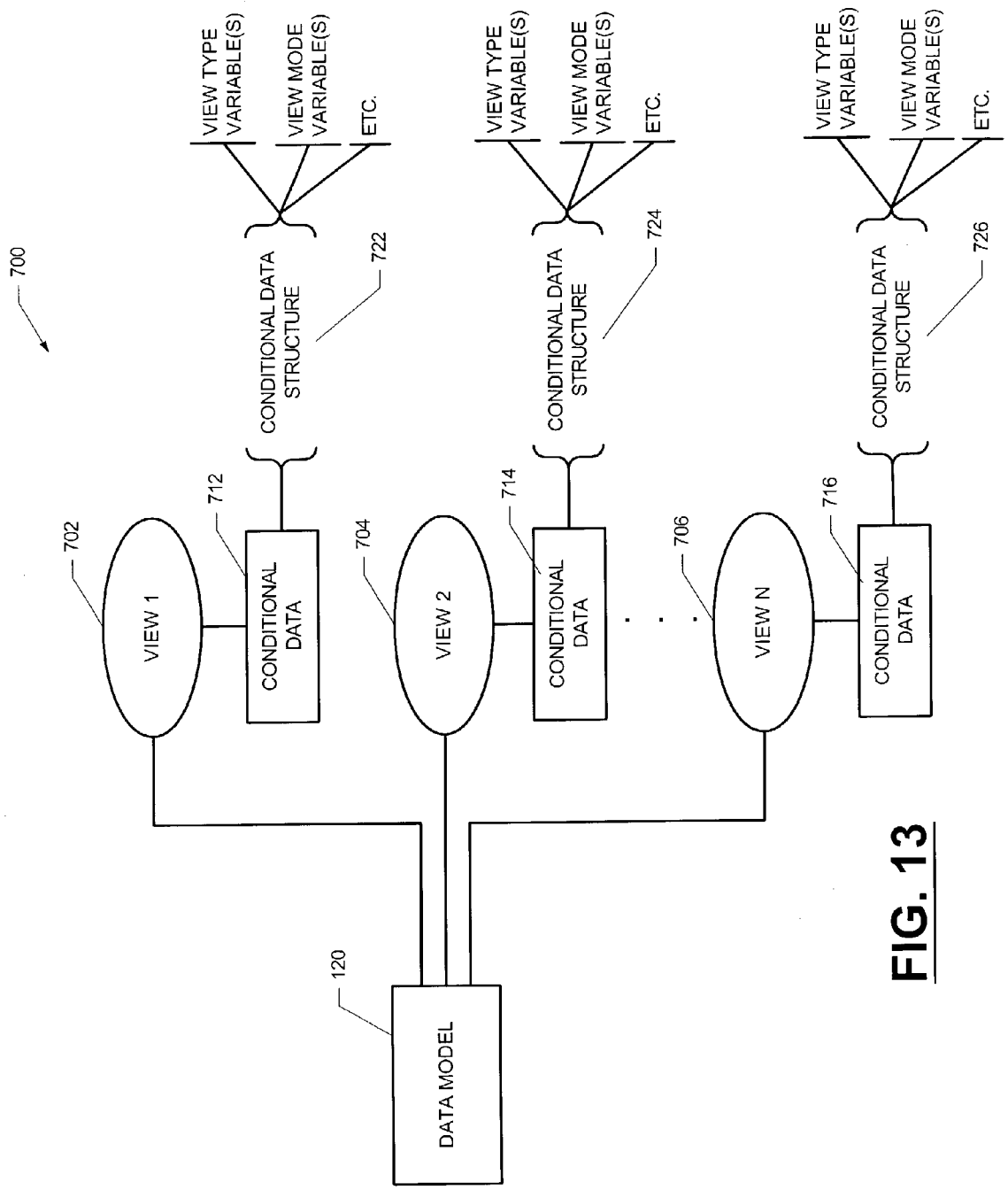
FIG. 13 is a block diagram showing an example of a conditional data structure.

As a further example of the wide scope of the systems disclosed herein, many different data structures may be used in storing conditional data for the views. As an illustration, FIG. 13 shows a system 700 wherein data structures (722, 724, 726) do not have a bit-mask configuration for storing conditional data (712, 714, 716) for views (702, 704, 706). Variable arrays and linked lists can store view type information as well as any other conditional data needed for operation, such as logical functions.

It is further noted that the systems described herein may be implemented on various types of computer architectures, such as for example on a single general purpose computer or workstation, or on a network (e.g., local area network, wide area network, or internet), or in a client-server configuration, or in an application service provider configuration. In multiple computer systems, data signals may be conveyed via fiber optic medium, carrier waves, wireless networks, etc. for communication among computers. The systems may be provided on many different types of computer readable media including instructions being executable by a computer to perform the systems described herein.

The computer components, software modules, functions and data structures described herein may be connected directly or indirectly to each other in order to allow the flow of data needed for their operations. It is also noted that a software module may include but is not limited to being implemented as one or more sub-modules which may be located on the same or different computer. A module may be a unit of code that performs a software operation, and can be implemented for example as a subroutine unit of code, or as a software function unit of code, or as an object (as in an object-oriented paradigm), or as an applet, or in a computer script language, or as another type of computer code.

It is claimed as the invention:

1. A computer-implemented apparatus for use in a data display system having a data model, wherein the data model contains data observations, comprising:
   a first view and a second view for concurrently displaying at least a portion of the data observations contained in the data model;
   wherein the first view is associated with first conditional data;
   wherein the first view's conditional data is for use in determining whether or not the first view's display is modified based upon a selection of a data observation within the second view, thereby determining whether to alter a display characteristic for a subset of the data observations of the first view.

2. The apparatus of claim 1, wherein data is selected within a third view;
   wherein the first view is also associated with a logical function;
   wherein the first view's logical function is applied in determining whether to modify the first view's display based upon a selection of the data observation within the second and third views.

3. The apparatus of claim 2, wherein the logical function is an intersection logical function.

4. The apparatus of claim 2, wherein the logical function is a union logical function.

5. The apparatus of claim 2, wherein the first view is configured as an observer view, wherein the second view and the third view are configured as selector views.

6. The apparatus of claim 2, wherein at least one of the views comprises a table.

7. The apparatus of claim 2, wherein at least one of the views comprises a graph.

8. The apparatus of claim 2, wherein the conditional data associated with the first view reduces the data selections across the second and third views.

9. The apparatus of claim 2, wherein a fourth view is associated with conditional data, wherein the first and fourth views display a subset of the data selected in the second and third views based upon their respective conditional data.

10. The apparatus of claim 9, wherein the fourth view displays a different subset of the selected data than the first view.

11. The apparatus of claim 10, wherein the first and fourth views are configured as observer views, wherein the second and third views are configured as selector views.

12. The apparatus of claim 11, wherein a selector view notifies the data model as to which observations have been selected.

13. The apparatus of claim 12, wherein the data model notifies the observer views as to which observations have been selected.

14. The apparatus of claim 2, wherein at least a portion of the conditional data is stored in bit-masks.

15. The apparatus of claim 14, wherein the second view requests an individual bit-mask from the data model to indicate which bit in the observation selection property the second view will be setting.

16. The apparatus of claim 15, wherein the first view requests an all views bit-mask from the data model so that the first view will know which bits are being used in an observation selection property.

17. The apparatus of claim 2, wherein the data model and the first view and the second view and the third view are part of a linked-view architecture.

18. The apparatus of claim 17, wherein each of the views share the data model.

19. The apparatus of claim 2, further comprising a mode selector for use by a user to switch between a global selection mode and a local selection mode;
   wherein all views operate equally with regard to an observation selection when the global selection mode is active;
   wherein the first view conditionally displays observation selections made by a user in the second and third views when the local selection mode is active.

20. The apparatus of claim 19, wherein collaboration between the views' application framework and the views is achieved through the data model.

21. The apparatus of claim 20, wherein the collaboration ensures that the views operate in the selected mode.

22. The apparatus of claim 2, wherein the views comprise a plurality of statistical plots.

23. The apparatus of claim 1, wherein the first conditional data is predetermined first conditional data such that data of the first conditional data is established before the selection of the data observation within the second view.

24. The apparatus of claim 1, wherein the first view's conditional data is to be applied to the selection of the data observation within the second view.

25. The apparatus of claim 1, wherein the display characteristic includes a visibility display characteristic;

wherein the first view's conditional data is for use in determining whether or not one or more of the first view's data observations are visible within the display of the first view, thereby determining whether a reduction in number of data observations is to occur with respect to the display of the first view.

26. The apparatus of claim 1, wherein the display characteristic includes a display characteristic that affects how prominently a data observation is displayed.

27. The apparatus of claim 26, wherein the display characteristic includes display size of a data observation within a display;
wherein the first view's conditional data is for use in determining whether or not the display size of one or more of the first view's data observations are to be modified within the display of the first view.

28. A computer-implemented apparatus for use in a data visualization system, comprising:
a data model containing data observations;
a first view, second view, and a third view that display at least a portion of the data observations contained in the data model;
first conditional data that has an association with the first view;
second conditional data that has an association with the second view;
wherein the conditional data associated with the first view determines how data selected in the third view is to be displayed within the first view;
wherein the conditional data associated with the second view determines how data selected in the third view is to be displayed within the second view;
wherein the first view displays different selected data than the second view because of the first view's conditional data.

29. The apparatus of claim 28, wherein data is selected in the third view and in a fourth view,
wherein the first conditional data associated with the first view and the second conditional data associated with the second view allow respectively the first and second views to determine on a per-view basis how data selected in another view is to be displayed.

30. A computer-implemented method for use in a data visualization system having a linked-view architecture, comprising the steps of:
associating first conditional data with a first view, wherein the first conditional data includes a logical function;
receiving data related to a selection of data in a second view;
receiving data related to a selection of data in a third view;
applying the logical function to the data selected in the second and third views to determine how to modify the first view's display, thereby determining whether to alter a display characteristic for a subset of the data observations with respect to the display of the first view;
said first, second and third views configured for concurrently displaying information.

31. A computer-implemented method for use in a data visualization system having a linked-view architecture, comprising the steps of:
associating first conditional data with a first view;
associating second conditional data with a second view;
receiving data related to a selection of data in a third view;
determining based upon the second view s conditional data that all of the selected data is to be displayed in the second view; and
determining based upon the second view's conditional data that a subset of the selected data is to be displayed in the second view, thereby determining whether to alter a display characteristic for the subset in the second view;
said first, second and third views concurrently displaying information.

32. A computer-implemented apparatus for use in a data visualization system having a linked-view architecture, comprising:
means for associating first conditional data with a first view, wherein the first conditional data includes a logical function;
means for receiving data related to a selection of data in a second view;
means for receiving data related to a selection of data in a third view;
means for applying the logical function to the data selected in the second and third views to determine how to modify the first view's display, thereby determining whether to alter a display characteristic for a subset of the data observations with respect to the display of the first view;
said first, second and third views concurrently displaying information.

33. The apparatus of claim 32 further comprising:
means for providing a bit-mask to the first view in order to determine how to display data selected in the views.

34. The apparatus of claim 32 further comprising:
means for switching a view between a selector view and an observer view.

35. The apparatus of claim 32 further comprising:
means for switching all views between a global selection mode and a local selection mode.

36. A computer-implemented apparatus for use in a data visualization system having a linked-view architecture, comprising:
means for associating first conditional data with a first view;
means for associating second conditional data with a second view;
means for receiving data related to a selection of data in a third view;
means for determining based upon the second view's conditional data that all of the selected data is to be displayed in the second view; and
means for determining based upon the second view's conditional data that a subset of the selected data is to be displayed in the second view, thereby determining whether to alter a display characteristic for the subset in the second view;
said first, second and third views concurrently displaying information.

37. The apparatus of claim 36 further comprising:
means for providing bit-masks to the first and second views in order to determine how to display data selected in the third view.

38. The apparatus of claim 36 further comprising:
means for switching a view between a selector view and an observer view.

39. The apparatus of claim 36 further comprising:
means for switching all views between a global selection mode and a local selection mode.

40. A computer-readable medium having computer-executable instructions for performing a method, wherein the instructions are for use in a data display system having a data model, wherein the data model contains data observations, said method comprising:
  displaying within a first view and a second view at least a portion of the data observations contained in the data model;
  wherein the first view is associated with first conditional data;
  using the first view's conditional data to determine whether or not the first view's display is modified based upon a selection of a data observation within the second view, thereby determining whether to alter a display characteristic for a subset of the data observations of the first view;
  said first and second views concurrently displaying information such that the display having the selected data observation within the second view and the display of the first view are concurrently displayed.

41. A computer-implemented method for use in a data display system having a data model, wherein the data model contains data observations, comprising:
  displaying within a first view and a second view at least a portion of the data observations contained in the data model;
  wherein the first view is associated with first conditional data;
  using the first view's conditional data to determine whether or not the first view's display is modified based upon a selection of a data observation within the second view, thereby determining whether to alter a display characteristic for a subset of the data observations of the first view;
  said first and second views concurrently displaying information such that the display having the selected data observation within the second view and the display of the first view are concurrently displayed.

42. The method of claim 41, wherein data is selected within a third view;
  wherein the first view is also associated with a logical function;
  wherein the first view's logical function is applied in determining whether to modify the first view's display based upon a selection of the data observation within the second and third views.

43. The method of claim 42, wherein the logical function is an intersection logical function.

44. The method of claim 42, wherein the logical function is a union logical function.

45. The method of claim 42, wherein the first view is configured as an observer view, wherein the second view and the third view are configured as selector views.

46. The method of claim 42, wherein at least one of the views comprises a table.

47. The method of claim 42, wherein at least one of the views comprises a graph.

48. The method of claim 42, wherein the conditional data associated with the first view reduces the data selections across the second and third views.

49. The method of claim 42, wherein a fourth view is associated with conditional data, wherein the first and fourth views display a subset of the data selected in the second and third views based upon their respective conditional data.

50. The method of claim 49, wherein the fourth view displays a different subset of the selected data than the first view.

51. The method of claim 50, wherein the first and fourth views are configured as observer views, wherein the second and third views are configured as selector views.

52. The method of claim 51, wherein a selector view notifies the data model as to which observations have been selected.

53. The method of claim 52, wherein the data model notifies the observer views as to which observations have been selected.

54. The method of claim 42, wherein at least a portion of the conditional data is stored in bit-masks.

55. The method of claim 54, wherein the second view requests an individual bit-mask from the data model to indicate which bit in the observation selection property the second view will be setting.

56. The method of claim 55, wherein the first view requests an all views bit-mask from the data model so that the first view will know which bits are being used in an observation selection property.

57. The method of claim 42, wherein the data model and the first view and the second view and the third view are part of a linked-view architecture.

58. The method of claim 57, wherein each of the views share the data model.

59. The method of claim 42, wherein a mode selector is used to switch between a global selection mode and a local selection mode;
  wherein all views operate equally with regard to an observation selection when the global selection mode is active;
  wherein the first view conditionally displays observation selections made by a user in the second and third views when the local selection mode is active.

60. The method of claim 59, wherein collaboration between the views' application framework and the views is achieved through the data model.

61. The method of claim 60, wherein the collaboration ensures that the views operate in the selected mode.

* * * * *

UNITED STATES PATENT AND TRADEMARK OFFICE
CERTIFICATE OF CORRECTION

PATENT NO. : 7,068,267 B2  Page 1 of 1
APPLICATION NO. : 10/413448
DATED : June 27, 2006
INVENTOR(S) : Meanor et al.

It is certified that error appears in the above-identified patent and that said Letters Patent is hereby corrected as shown below:

In column 9, line 65, delete "view s" and insert -- view's --.

Signed and Sealed this

Twelfth Day of September, 2006

JON W. DUDAS
*Director of the United States Patent and Trademark Office*